United States Patent [19]
Anota

[11] Patent Number: 4,741,325
[45] Date of Patent: May 3, 1988

[54] OPERATING VALVE FOR A PRESSURE COOKER

[75] Inventor: Daniel Anota, Dijon, France

[73] Assignee: Seb S.A., Selongey, France

[21] Appl. No.: 7,561

[22] Filed: Jan. 28, 1987

[30] Foreign Application Priority Data

Jan. 29, 1986 [FR] France ............................ 86 01244

[51] Int. Cl.⁴ .............................................. A47J 27/00
[52] U.S. Cl. ................................ 126/389; 137/533.21; 137/534; 251/253; 220/203; 220/208
[58] Field of Search ........... 137/534, 523, 532, 533.21, 137/533.27, 533.29; 220/203, 206, 208, 231, 374; 126/389, 369; 251/252, 253, 254, 256, 262

[56] References Cited

U.S. PATENT DOCUMENTS 1,142,389 6/1915 Allan .................................. 251/253
2,428,483 10/1947 Wittenberg .
2,590,620 3/1952 Holbik .

FOREIGN PATENT DOCUMENTS 1188831 9/1959 France .
WO80/02496 11/1980 PCT Int'l Appl. .
313141 3/1956 Switzerland ........................ 220/203
2108639 5/1983 United Kingdom .
2115107 9/1983 United Kingdom .

Primary Examiner—James C. Yeung
Assistant Examiner—Noah Kamen
Attorney, Agent, or Firm—Young & Thompson

[57] ABSTRACT

The operating valve for a domestic pressure cooker has a movable body provided with a cone-point valve pintle which rests on the nozzle for the discharge of steam from the pressure cooker. The movable valve body has a lateral steam discharge opening of dissymmetrical shape so that the escaping steam produces a torque which tends to cause pivotal displacement of said movable valve body about its axis. The movable valve body has an abutment lug which cooperates with a stationary stop in order to prevent pivotal displacement of the valve body under the action of the torque aforesaid.

9 Claims, 2 Drawing Sheets

FIG_1

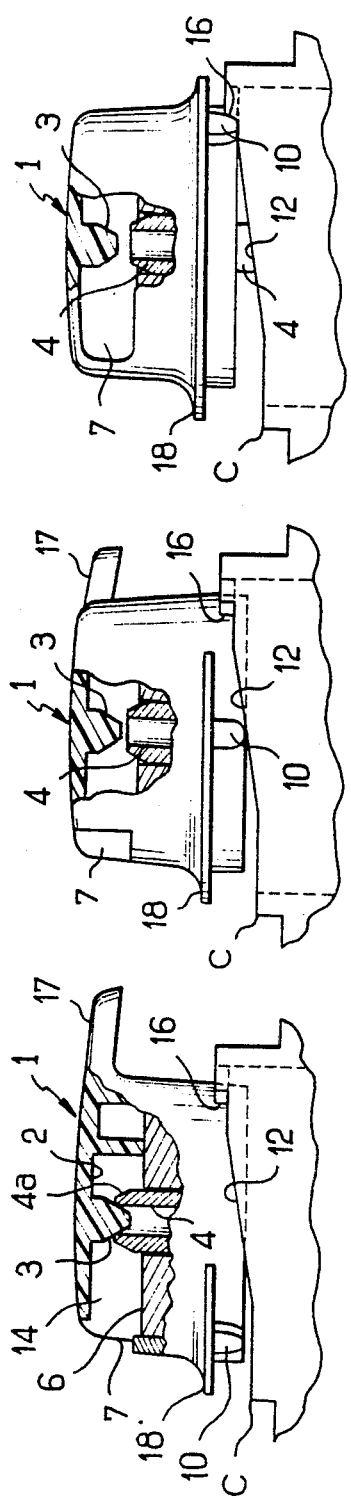
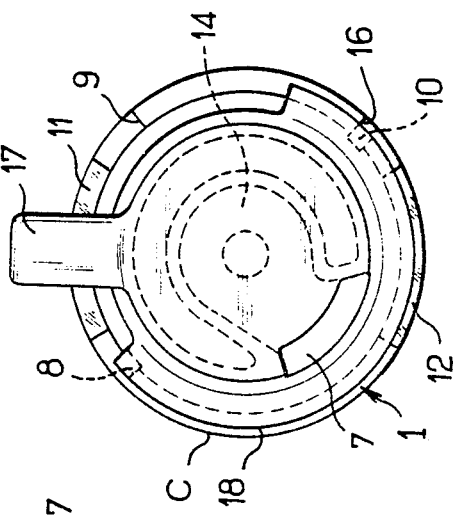
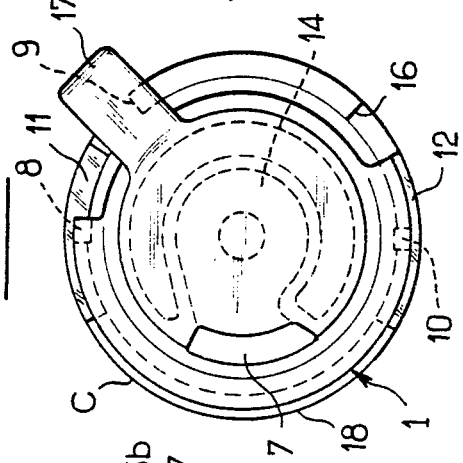
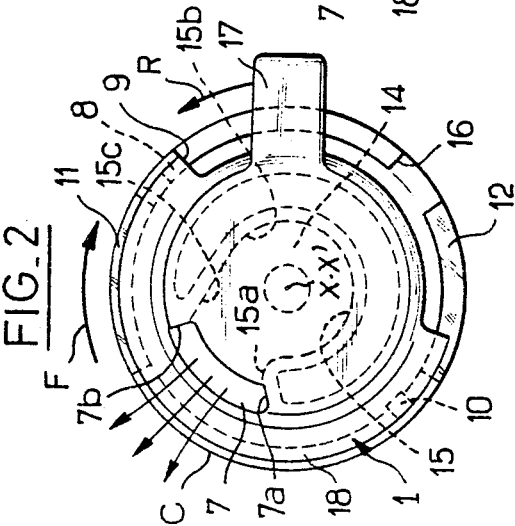
FIG.2   FIG.3
FIG.4   FIG.5
FIG.6   FIG.7

OPERATING VALVE FOR A PRESSURE COOKER

BACKGROUND OF THE INVENTION

1. Field of the Invention

The present invention relates to an operating valve for a pressure cooker.

2. Description of the Prior Art

Many different types of operating valves for pressure cookers are already known. These known types include in particular rotary valves in which a movable body is designed in the form of a cap, the internal face of the cap end-wall being provided with a central cone-point valve pintle. When the valve is in the operating position, the pintle rests freely on the steam discharge nozzle of the pressure cooker.

In certain designs, the interior of the movable valve body is provided with a ballast weight so arranged that the center of gravity of the movable body is located beneath the valve pintle.

Moreover, the movable valve body is provided with one or a number of lateral openings for the release of steam.

When the pressure of the cooking vapor formed within the pressure cooker attains the desired value, the pintle of the movable valve body is lifted from the upper end of the discharge nozzle, thus allowing the vapor to escape to the exterior of the movable valve body. The valve thus maintains a substantially constant pressure within the pressure cooker.

In known designs which correspond to the structure described in the foregoing, the escape of steam causes rotation of the movable body, thus producing noise which many users find objectionable.

The aim of the present invention is to overcome this disadvantage by providing a relief valve which remains motionless during operation while at the same time ensuring the high standard of operational safety which is achieved by rotary valves.

SUMMARY OF THE INVENTION

The operating valve contemplated by the invention has a movable body in the form of a cap, the internal face of the end-wall of said cap being provided with a central cone-point valve pintle which rests freely on the steam discharge nozzle of the pressure cooker when the valve is in the operating position, the interior of the movable valve body being fitted with a ballast weight so arranged as to ensure that the center of gravity of the movable valve body is located beneath the valve pintle, said movable body being provided with a lateral steam-release opening.

The distinguishing feature of the valve in accordance with the invention lies in the fact that the lateral opening of the movable valve body is dissymmetrical so as to ensure that the release of steam produces a torque which tends to displace the movable valve body in pivotal motion about its axis and that said valve body is provided with an abutment lug in cooperating relation with a stationary stop for preventing pivotal displacement of said valve body under the action of the torque aforesaid.

Thus, at the time of operation of the valve, the torque developed by the release of steam causes pivotal displacement of the valve body until the abutment lug of said body is applied against the stationary stop. Since the movable valve body is thus locked in position, no unpleasant noise is produced during operation of the valve.

In an advantageous embodiment of the invention, the valve is provided with means for lifting the movable valve body by causing said body to rotate in order to place it in the steam discharge position.

The lifting means aforesaid preferably include at least one lug which is formed on the movable valve body and can be caused to engage on a stationary guide ramp by rotating said valve body.

In a preferred embodiment of the invention, the torque produced by the release of steam through the dissymmetrical opening is opposite to the direction of rotation of the movable valve body in order to put said valve body in the steam discharge position.

Thus the valve is not liable to pivot accidentally towards the steam discharge position.

BRIEF DESCRIPTION OF THE DRAWINGS

FIG. 2 is a fragmentary cutaway view in elevation showing the valve in the operating position.

FIG. 3 is a top view of the valve in the position shown in FIG. 2.

FIG. 4 is a view in elevation of the valve in the initial steam discharge position.

FIG. 5 is a top view of the valve in the position shown in FIG. 4.

FIG. 6 is a view which is similar to FIG. 4 and in which the valve is in the final steam discharge position.

FIG. 7 is a top view of the valve in the position shown in FIG. 6.

DESCRIPTION OF THE PREFERRED EMBODIMENTS

Figure 1:
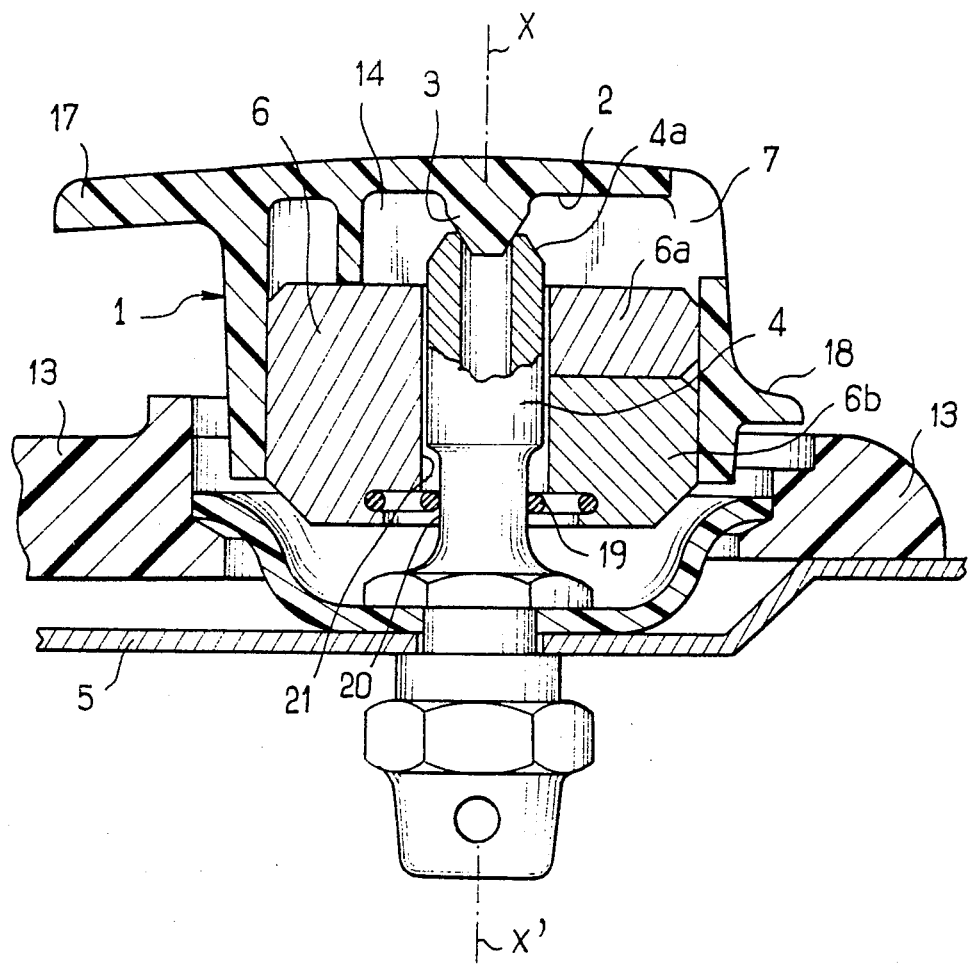
FIG. 1 is a longitudinal sectional view of a valve in accordance with the invention, said valve being in position on the steam discharge nozzle of a pressure cooker.

In the embodiment of FIG. 1, the operating valve for a pressure cooker has a movable body 1 in the form of a cap made of plastic material, for example. The end-wall 2 of said valve body is provided on its internal face with a central cone-point valve pintle 3 which rests freely on the steam discharge nozzle 4 of the pressure cooker. Said nozzle 4 is attached to the lid 5 of the pressure cooker.

There is housed within the movable valve body 1 a ballast weight 6 so arranged that the center of gravity of the movable body 1 is located beneath the valve pintle 3.

The movable valve body 1 is provided in addition with a lateral opening 7 for the release of steam.

In accordance with the invention, the lateral opening 7 of the valve body 1 is dissymmetrical (as shown in FIGS. 3, 5 and 7) so as to ensure that the release of steam produces a torque (as indicated by the arrow F of FIG. 3) which tends to produce a pivotal displacement of said valve body 1 about its axis X-X'.

In addition, the movable valve body 1 is provided with an abutment lug 8 in cooperating relation with an abutment lug or stop 9 which is stationarily fixed with respect to the lid 5 of the pressure cooker (see FIG. 3) so as to prevent pivotal displacement of said valve body 1 under the action of the torque F aforesaid.

The valve in accordance with the invention is also provided with means for lifting the valve body 1 by rotating this latter in order to put said valve body in the steam discharge position.

In the embodiment which is illustrated (in FIGS. 2 to 7), the aforementioned lifting means include two diametrically opposite lugs 8, 10 which are attached to the bottom portion of the valve body 1. When said valve body 1 is rotated about its axis X-X', the two lugs 8, 10 aforesaid are capable of engaging on two guide ramps 11, 12 which are fixed with respect to the lid 5 of the pressure cooker and extend in diametrically opposite relation on a circle C.

The two lugs 8, 10 mentioned in the foregoing are parallel to the axis X-X' and are carried by a rim 18 which is perpendicular to this axis and extends over slightly more than 180° about said axis.

In the embodiment shown in the drawings, the stationary abutment lug 9 and the guide ramps 11, 12 are formed on a handle 13 which is rigidly fixed to the lid 5 of the pressure cooker.

The torque F produced by the steam which escapes through the dissymmetrical opening 7 is opposite to the direction of rotation R (see FIG. 3) of the movable valve body 1 so as to put this latter in the steam discharge position.

As shown in FIGS. 1 and 2, the dissymmetrical lateral opening 7 is formed opposite to the valve pintle 3 and opposite to the end portion 4a of the discharge nozzle 4 which receives said valve pintle.

It is further apparent from FIGS. 1 and 2 that the movable valve body 1 has a cavity 14 which is formed between the end-wall 2 of said valve body and the ballast weight 6. Said cavity 14 surrounds the valve pintle 3 and the upper end 4a of the discharge nozzle. In addition, said cavity 14 communicates with the exterior through the lateral steam-discharge opening 7.

As shown in dashed outline in FIGS. 3, 5 and 7, the cavity 14 aforesaid is bounded laterally by a cylindrical surface 15 which is coaxial with the valve pintle 3 and with the discharge nozzle 4.

One end portion 15a of said cylindrical surface 15 is practically directly joined to one lateral edge 7a of the steam release opening 7 and the other end portion 15b of said cylindrical surface is joined to the other lateral edge 7b of the opening 7 by means of a flat surface 15c which is substantially tangent to the end portion 15b of the cylindrical surface 15.

It is also apparent from FIGS. 2 to 7 that a second stationary abutment lug or stop 16 placed beyond the summit of the guide ramp 12 which cooperates with the lug 10 formed on the movable valve body 1 is intended to limit the movement of rotation of the valve body 1 in a direction R opposite to the direction of the torque F exerted by the steam released from the opening 7. Said second stop 16 defines the final position of steam discharge (as shown in FIGS. 6 and 7).

The movable valve body 1 is provided in addition with a gripping tongue 17 which is remote from the steam release opening 7.

Furthermore, it is apparent from FIG. 1 that the ballast weight 6 is removably fixed within the valve body 1 and that the bottom portion of said weight is fitted with a spring 19 which is resiliently applied within an annular groove 20 formed within the discharge nozzle 4, thus making it possible to mount the valve body 1 on said nozzle by snap-action engagement, the height of said groove 20 being sufficient to permit lifting of the valve body 1 when the lugs 8, 10 move upwards on the guide ramps 11, 12.

The discharge nozzle 4 is engaged within the central bore 21 of the ballast weight 6 with minimum clearance in order to ensure that the steam escapes entirely through the opening 7.

The ballast weight 6 can be replaced by a weight made up of two portions 6a, 6b (as shown on the right-hand side of FIG. 1) and of lighter weight, thus permitting operation of the valve at lower pressures.

The operation of the valve described in the foregoing is as follows:

In the operating position illustrated in FIGS. 1 and 2, the valve pintle 3 bears on the discharge nozzle 4. The lugs 8, 10 of the valve body 1 are located externally of the guide ramps 11, 12 and are not in contact with the circular track on which these guide ramps are formed.

When the steam attains the operating pressure, the valve pintle 3 is lifted from the nozzle 4 and the steam escapes to the exterior through the opening 7.

By virtue of the dissymmetry of said opening 7, of the shape of the cavity 14 and in particular of the flat surface 15c which acts as a deflector with respect to the steam flow path, the release of steam develops a torque F (see FIG. 3) such that the lug 8 is abuttingly applied against the stationary stop 9. Thus the valve body 1 remains motionless and is not liable to pivot accidentally in the direction R, that is to say towards the steam discharge position.

Upon completion of the cooking process, the user rotates the valve body 1 in the direction R. During this movement of rotation, the lugs 8, 10 move upwards along the guide ramps 11, 12 (as shown in FIG. 4) and the valve pintle 3 is lifted from the nozzle 4, thus permitting steam discharge. The frictional contact of the lugs 8, 10 on the guide ramps 11, 12 is such that the valve body 1 is stable in all positions of the lugs 8, 10 on the guide ramps 11, 12 in spite of the torque F produced by the escaping steam.

The user may thus progressively increase the steam-discharge flow rate by causing a progressive upward displacement of the lugs 8, 10 on the guide ramps 11, 12.

The maximum steam-discharge flow rate is attained in the position shown in FIGS. 6, 7. In this position, the lug 10 is applied against the stationary stop 16.

What is claimed is:

1. An operating valve for a pressure cooker having a steam discharge nozzle (4) having an upper end (4a), said valve comprising a movable valve body (1) in the form of a cap having an end-wall (2) provided with a central conical valve pintle (3) adapted to close the nozzle (4), the interior of the movable valve body having a ballast weight (6) so arranged that the center of gravity of the movable body is located beneath the valve pintle, the movable valve body (1) having a cavity (14) which is formed between the end-wall (2) of the movable valve body and the ballast weight (6) and surrounds the valve pintle (3) and the upper end (4a) of the discharge nozzle, said cavity (14) communicating with the exterior by a steam release opening (7), said cavity having a dissymetrical shape, such that the passage of the steam in said cavity and release of steam from said opening produce a torque (F) which tends to displace said movable valve body (1) in pivotal motion around the nozzle, said valve body having an abutment lug (8) adapted to engage a stationary stop (9) for preventing pivotal displacement of said valve body under the action of said torque.

2. A valve according to claim 1, wherein said cavity (14) is bounded laterally by a partially cylindrical surface (15) which is coaxial with the valve pintle (3) and with the discharge nozzle (4), one end portion (15a) of said cylindrical surface (15) being substantially directly joined to one lateral edge (7a) of the steam release opening (7) and the other end portion (15a) of said cylindrical surface being joined to the other lateral edge (7b) of said opening by means of a flat surface (15c) which is substantially tangent to said end portion (15b) of said cylindrical surface.

3. A valve according to claim 2, wherein said valve has means for lifting the movable valve body (1) by causing said valve body to rotate in a direction (R) and unseat the pintle (3) in order to place it in a steam discharge position.

4. A valve according to claim 3, wherein said lifting means include at least one lug (10) which is formed on the movable valve body (1) and is adapted to engage a stationary guide ramp (12) by rotating said valve body (1).

5. A valve according to claim 3, wherein said lifting means include two diametrically opposite lugs (8, 10) in cooperating relation with two stationary guide ramps (11, 12) which are also diametrically opposite.

6. A valve according to claim 5, wherein the stationary stop (9) and the guide ramps (11, 12) are formed on a handle (13) which is rigidly fixed to the lid (5) of the pressure cooker.

7. A valve according to claim 5, wherein a second stationary stop (16) adapted to cooperate with one of the lugs (10) formed on the movable valve body (1) is designed to limit the rotation of said valve body in a direction opposite to that of the torque (F) exerted by the steam released through the opening, said second stop (16) being adapted to define a maximum final steam discharge position.

8. A valve according to claim 3, wherein the torque (F) produced by the release of steam through the opening (7) is opposite to the direction of rotation (R) of the movable valve body (1).

9. A valve according to claim 1, wherein the movable valve body (1) has a gripping tongue (17) located opposite to the steam release opening (7).

* * * * *